United States Patent [19]
Tanaka et al.

[11] Patent Number: 6,057,899
[45] Date of Patent: May 2, 2000

[54] LIGHTING OPTICAL SYSTEM

[75] Inventors: Yoshitaka Tanaka; Kazuyuki Shirai; Tooru Yokoo; Yoshiharu Suzuki, all of Yamanashi-ken, Japan

[73] Assignee: Pioneer Electronic Corporation, Tokyo-To, Japan

[21] Appl. No.: 08/887,895

[22] Filed: Jul. 3, 1997

[30] Foreign Application Priority Data

Jul. 4, 1996 [JP] Japan ................................. 8-193891
Aug. 30, 1996 [JP] Japan ................................. 8-248771

[51] Int. Cl.[7] .................... G02F 1/1335; G02B 27/10; F21V 21/36
[52] U.S. Cl. ........................... 349/95; 349/5; 359/621; 362/391
[58] Field of Search ................ 349/95, 5; 362/26, 362/226, 263, 391; 359/620, 621, 622

[56] References Cited

U.S. PATENT DOCUMENTS

| | | | |
|---|---|---|---|
| 5,083,854 | 1/1992 | Zampolin et al. | 349/95 |
| 5,098,184 | 3/1992 | Van Den Brandt et al. | 359/622 |
| 5,388,034 | 2/1995 | Allen et al. | 362/263 |
| 5,418,583 | 5/1995 | Masumoto | 353/38 |
| 5,666,226 | 9/1997 | Ezra et al. | 359/621 |
| 5,786,939 | 7/1998 | Watnabe | 359/621 |

*Primary Examiner*—William L. Sikes
*Assistant Examiner*—Dung Nguyen
*Attorney, Agent, or Firm*—Sughrue, Mion, Zinn Macpeak & Seas, PLLC

[57] ABSTRACT

A lighting optical system 100 having: a light source 101 for emitted a light; a reflector 102 for reflecting the emitted light; a first integrator lens unit 103 disposed at a place where a surface thereof crosses an optical axis of the reflected light, the first integrator lens unit 103 having a plurality of micro lenses 109 arranged in a matrix, the first integrator lens unit 103 dividing at least the reflected light into a plurality of lights corresponding to the micro lenses 109 respectively, an area of two micro lenses 109A and 109B disposed at a center portion of the first integrator lens unit 103 being larger than an area of any one of the micro lenses 109 disposed in the first integrator lens unit 103 other than said at least one; and a second integrator lens unit 104 disposed at a place where a surface thereof crosses an optical axis of each of the divided lights, the second integrator lens unit 104 having a plurality of micro lenses arranged in a matrix, the second integrator lens unit 104 for condensing the divided lights so that the condensed lights are irradiated into a display panel 106.

11 Claims, 8 Drawing Sheets

LIGHTING OPTICAL SYSTEM

BACKGROUND OF THE INVENTION

1. Field of the Invention

The present invention relates to a lighting optical system suitable for use in a projection apparatus such as a liquid crystal projector or the like.

2. Description of the Related Art

A lighting optical system is used for a projection apparatus such as a reflection type liquid crystal display apparatus. The reflection type liquid crystal display apparatus has: a light source for emitting the light such as a lamp; a reflector constructed of a concave reflecting device shaped like a cup, for reflecting the light emitted from the light source; a first integrator lens unit having a plurality of micro lenses, which are arrayed in a matrix, for example a 4×5 matrix, for dividing the light reflected by the reflector; a second integrator lens unit having a plurality of micro lenses, which are arrayed in a matrix in correspondence with each of the micro lenses of the first integrator lens unit, for superposing the lights divided by the first integrator lens unit; a condenser lens for condensing the lights passing through the micro lenses of the second integrator lens unit; and a display panel constructed of a liquid crystal display unit.

Further, the light source is disposed in the bottom side of the reflector shaped like a cup, namely, the back side of the light source is surrounded with the inner concave surface of the reflector. Further, the light source is disposed at the center of the reflector. The reflector spreads out like a cup toward the first integrator lens unit. The first integrator lens unit is disposed in front of the light source and the reflector at a distance. The second integrator lens unit is disposed in front of the first integrator lens unit at a distance. The condenser lens is disposed in front of the second integrator lens unit at a distance. The display panel is disposed in front of the condenser lens at a distance.

In operation, the light irradiated from the light source is emitted in the inner concave surface of the reflector, and the reflected light is irradiated into the first integrator lens unit. At this time, the reflected light is divided into a plurality of lights respectively corresponding to the micro lenses of the first integrator lens unit. Namely, the reflected light is divided into a plurality of lights in a matrix-like manner by the micro lenses disposed in the first integrator lens unit. Then, each of the divided lights is irradiated into the micro lenses disposed in the second integrator lens unit, and the divided lights are condensed and superposed by the micro lenses disposed in the second integrator lens unit. Further, superposed lights are condensed by the condense lens and the condensed lights are irradiated into the display panel.

In this manner, the light emitted from the light source is divided by the first integrator lens unit, and the divided lights are superposed by the second integrator lens unit, so that the uniform light can be irradiated into the display panel. Thus, the brightness of the display panel can be made uniform.

However, as mentioned above, the light source is disposed in the bottom side of the reflector shaped like a cup. Namely, the light source is disposed between the bottom portion of the reflector and the first integrator lens unit. Further, the light source is positioned on the axis between the central portion of the reflector and the central portion of the first integrator lens unit. Therefore, when the light is emitted form the light source and reaches the first integrator lens unit, the light irradiated into the first integrator lens unit is affected by the components of the light source at the center portion of the first integrator lens unit. Namely, the component of the light source obstructs the progression of the light, which is emitted from the light source and reaches the first integrator lens unit. As a result, the intensity of the light irradiated into the center portion of the first integrator lens unit is different from that of the light irradiated to other portions of the first integrator lens unit. Thus, the micro lenses disposed at the center portion of the first integrator lens unit are affected by the components of the light source.

As a result, a shadow of the components of the light source appears in the display panel. Therefore, it may happen a case that non-uniformity of luminous intensity and non-uniformity of color appear in the display panel, and the quality of display is degraded.

Further, the light source has a lead wire for supplying power and controlling the light. This lead wire connects the light source disposed in the reflector shaped like a cup and a power supply disposed at the out of the reflector to each other. Further, the reflector has a wiring hole in order to lead the line wire toward the out side thereof. This wiring hole is disposed near the center portion of the bottom side of the reflector. Therefore, the light irradiated to the first integrator lens unit is affected by the lead wire and the wiring hole. Namely, shadows of each of the lead wire and the wiring hole appear in the display panel. Thus, it may happen that non-uniformity of luminous intensity and non-uniformity of color appear in the display panel, and the quality of display is degraded.

SUMMARY OF THE INVENTION

It is therefore an object of the present invention to provide a lighting optical system which can prevent the appearance of the non-uniformity of luminous intensity and the non-uniformity of color in the display panel, and which can improve the quality of display.

According to the present invention, the above mentioned object can be achieved by a lighting optical system for irradiating a light into a display panel, having: a light source for emitted a light; a reflector for reflecting the emitted light; a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively, an area of at least one of the micro lenses disposed at a center portion of the first integrator lens unit being larger than an area of any one of the micro lenses disposed in the first integrator lens unit other than said at least one; and a second integrator lens unit disposed at a place where a surface thereof crosses an optical axis of each of the divided lights, the second integrator lens unit having a plurality of micro lenses arranged in a matrix, the second integrator lens unit for condensing the divided lights so that the condensed lights are irradiated into the display panel.

In operation, a light is emitted from the light source, and the emitted light is reflected in the reflector. The reflected light is irradiated into each of the micro lens disposed in the first integrator lens unit, and in the first integrator lens unit, the reflected light is divided into a plurality of lights. Then, each of the divided lights is irradiated into the micro lens disposed in the second integrator lens unit and in the second integrator lens unit, the divided lights are condensed and superposed, and the condensed light are irradiated into the display panel.

Here, as mentioned above, at least one of the micro lenses disposed at the center of the first integrator lens unit has an area which is larger than that of any other micro lenses disposed in the first integrator lens unit. Therefore, an area of the light, which is irradiated into the display panel after coming through the micro lens whose area is larger than that of any other micro lenses, is extended. Thus, the beam of light passing through the edge side in the area of the micro lens disposed at the center of the first integrator lens unit is irradiated into the outside the effective projection area of the display panel, so that this beam of light is substantially removed from the display panel. As a result, even if the shadows of the component of the light source, the lead wire and the wiring hole of the reflector are projected at the edge side in the micro lens disposed at the center of the first integrator lens unit, these shadows are substantially removed from the display panel. Therefore, the non uniformity of luminous intensity and the non uniformity of color are removed from the display panel. Here, the effective projection area A is the area that light and images actually appear in the display panel, so-called a visible region.

According to the present invention, the above mentioned object can be achieved by a lighting optical system for irradiating a light into a display panel, having: a light source for emitting a light; a reflector for reflecting the emitted light; a first integrator lens unit disposed at the place that a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, a focus distance of at least one of the micro lenses disposed at a center portion of the second integrator lens unit being longer than a focus distance of any one of the micro lenses disposed in the second integrator lens unit other than said at least one.

Therefore, since a focus distance of at least one of the micro lenses disposed at the center portion of the first integrator lens unit is longer than that of any other micro lenses of the first integrator lens unit, an area of the light, which is irradiated into the display panel after coming through the micro lens whose area is larger than that of any other micro lenses, is extended. Thus, the beam of light passing through the edge side in the area of the micro lens disposed at the center of the first integrator lens unit is irradiated outside the out of the effective projection area of the display panel, so that this beam of light is substantially removed from the display panel. As a result, even if the shadows of the component of the light source, the lead wire and the wiring hole of the reflector are projected at the edge side in the micro lens disposed at the center of the first integrator lens unit, these shadows are substantially removed from the display panel. Therefore, the non-uniformity of luminous intensity and the non-uniformity of color are removed from the display panel.

According to the present invention, the above mentioned object can be achieved by a lighting optical system for irradiating a light into a display panel, having: a light source for emitting a light; a reflector for reflecting the emitted light; a first integrator lens unit disposed at the place that a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, at least one of the micro lenses disposed at a center portion of the second integrator lens unit comprising a toric lens.

Here, the focus distance of the toric lens changes by the direction of the light passing through. This toric lens is formed such that the area of the light irradiated into the display panel is extended. Therefore, the shadows of the component of the light source, the lead wire and the wiring hole of the reflector are substantially removed from the display panel. Thus, the non-uniformity of luminous intensity and the non-uniformity of color are removed from the display panel.

According to the present invention, the above mentioned object can be achieved by a lighting optical system for irradiating a light into a display panel, having: a light source having a lamp for emitting a light and a lead wire for connecting the lamp to a power supply disposed at the external; a reflector having a concave portion for reflecting the emitted light by an inner surface thereof, a mounting hole for mounting the lamp of the light source and a wiring hole for wiring the lead wire from the lamp to the power supply; a mounting member disposed in the mounting hole for mounting the lamp of the light source; a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, the lead wire of the light source being wired along an outside face of the mounting member.

Therefore, since the lead wire is disposed at the portion close to the light source, the shadow of the lead wire can be removed from the display panel. Thus, the non-uniformity of luminous intensity and the non-uniformity of color are removed from the display panel.

According to the present invention, the above mentioned object can be achieved by a lighting optical system for irradiating a light into a display panel, having: a light source having a lamp for emitting a light and a lead wire for connecting the lamp to a power supply disposed at the external; a reflector having a concave portion for reflecting the emitted light by an inner surface thereof, a mounting hole for mounting the lamp of the light source and a wiring hole for wiring the lead wire from the lamp to the power supply; a mounting member disposed in the mounting hole for mounting the lamp of the light source; a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, the lead wire of the light source being disposed at a position opposite to a boundary between the micro lenses disposed in the first integrator lens unit in a condition of seeing the lead wire through the first integrator lens unit from the side where the display panel is disposed.

Here, light and images included in the area beside the boundary between the micro lenses disposed in the first integrator lens unit are irradiated into the edge side in the area of the micro lens disposed in the first integrator lens unit. The light and images are projected at outside of the effective projection area of the display panel, so that this light and images are substantially removed from the display panel. Thus, the non-uniformity of luminous intensity and the non-uniformity of color are removed from the display panel.

According to the present invention, the above mentioned object can be achieved by a lighting optical system for irradiating a light into a display panel, having: a light source having a lamp for emitting a light and a lead wire for connecting the lamp to a power supply disposed at the external; a reflector having a concave portion for reflecting the emitted light by an inner surface thereof, a mounting hole for mounting the lamp of the light source and a wiring hole for wiring the lead wire from the lamp to the power supply; a mounting member disposed in the mounting hole for mounting the lamp of the light source; a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, the wiring hole of the reflector being disposed at the position opposite to a boundary between the micro lenses disposed in the first integrator lens unit in a condition of seeing the lead wire through the first integrator lens unit from the side where the display panel is disposed.

Therefore, since light and images included in the area beside a boundary between the micro lenses disposed in the first integrator lens unit are irradiated into the edge side in the area of the micro lens disposed in the first integrator lens unit, the light and images are projected at outside of the effective projection area of the display panel. Thus, the light and images are substantially removed from the display panel. As a result, the non-uniformity of luminous intensity and the non uniformity of color are removed from the display panel.

According to the present invention, the above mentioned object can be achieved by a lighting optical system for irradiating a light into a display panel, having: a light source having a lamp for emitting a light and a lead wire for connecting the lamp to a power supply disposed at the external; a reflector having a concave portion for reflecting the emitted light by an inner surface thereof, a mounting hole for mounting the lamp of the light source and a wiring hole for wiring the lead wire from the lamp to the power supply; a mounting member disposed in the mounting hole for mounting the lamp of the light source; a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of lights corresponding to the micro lenses respectively; and a second integrator lens unit disposed at a place where a surface thereof crosses an optical axis of each of the divided lights, the second integrator lens unit having a plurality of micro lenses arranged in a matrix, the second integrator lens unit condensing the divided lights so that the condensed lights are irradiated into the display panel, the lead wire of the light source being wired from the lamp of the light source to the power supply disposed at the external through the mounting hole.

Therefore, since the lead wire is disposed at the approximately same portion as the light source, the shadow of the lead wire can be removed from the display panel. Thus, the non-uniformity of luminous intensity and the non-uniformity of color are removed from the display panel.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

At first, a first embodiment of the present invention will be explained with reference to FIGS. 1 to 6.

Figure 1:
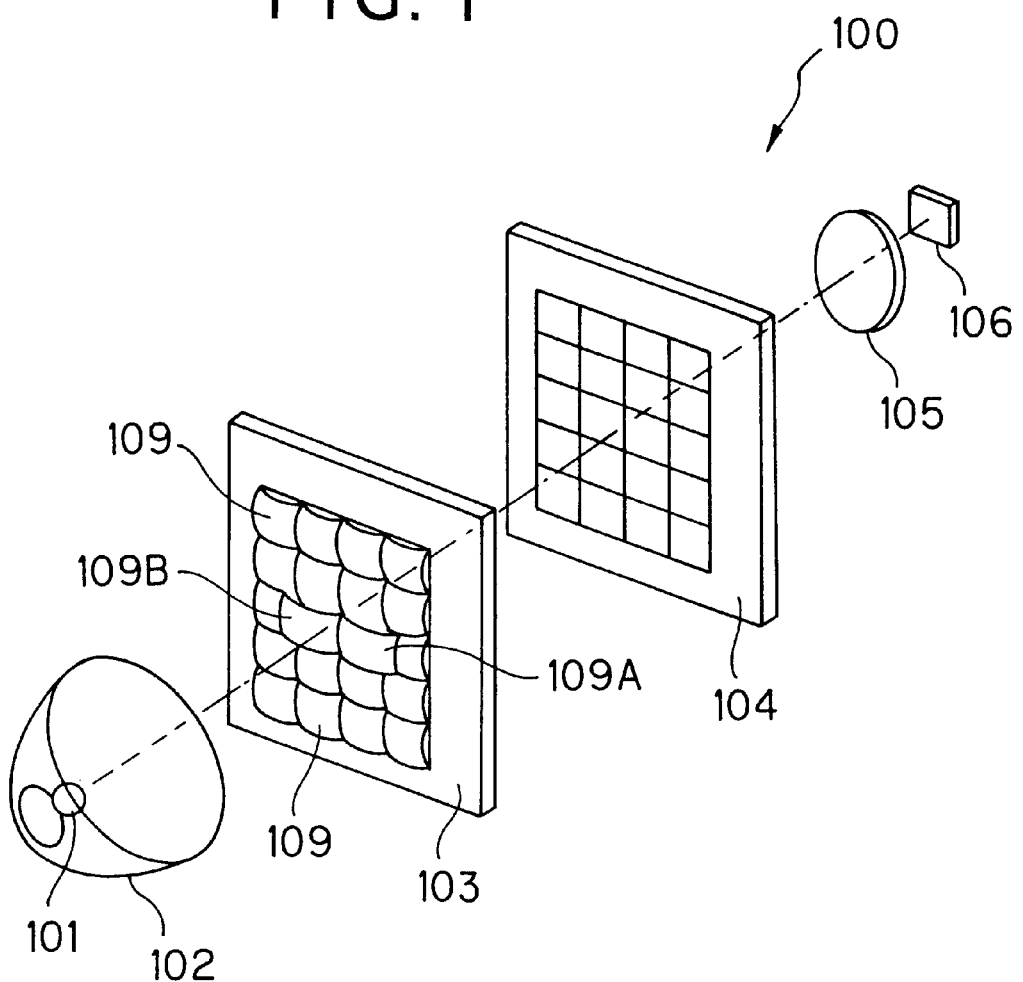
FIG. 1 is a perspective view for showing a lighting optical system of a first embodiment.

In FIG. 1, a construction of a lighting optical system 100 of the first embodiment of the present invention is shown. The lighting optical system 100 is provided with: a light source 101 for emitting a light; a reflector 102 for reflecting the light emitted from the light source; a first integrator lens unit 103 for dividing the light reflected by the reflector into a plurality of lights; a second integrator lens unit 104 for condensing and superposing the lights divided by the first integrator lens unit; a condenser lens 105 for further condensing the superposed light passing through the second integrator lens unit 104; and a display panel 106 such as a liquid crystal display unit.

Figure 2:
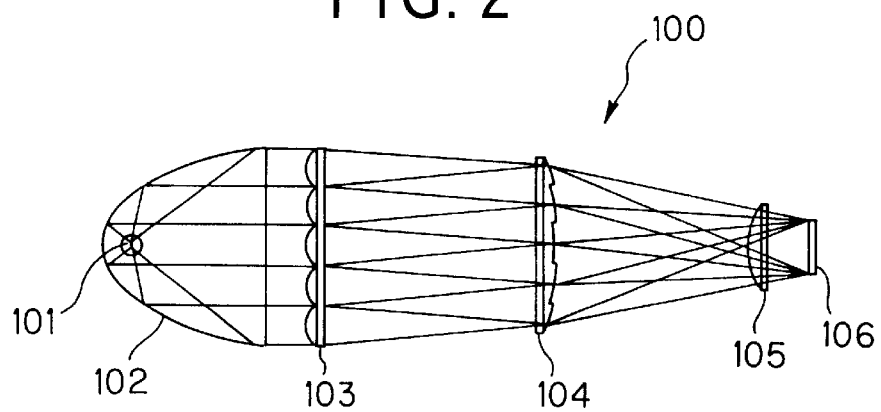
FIG. 2 is a sectional view for showing the lighting optical system of the first embodiment.

As shown in FIGS. 1 and 2, the light source 101 is disposed at the bottom side of the reflector 102. Further, the light source 101 is positioned on the axis between the central portion of the reflector 102 and the central portion of the first integrator lens unit 103.

Figure 3:
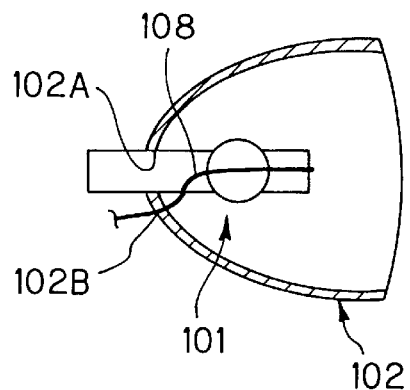
FIG. 3 is a sectional view for showing a light source included in the lighting optical system of the first embodiment.
Figure 4:
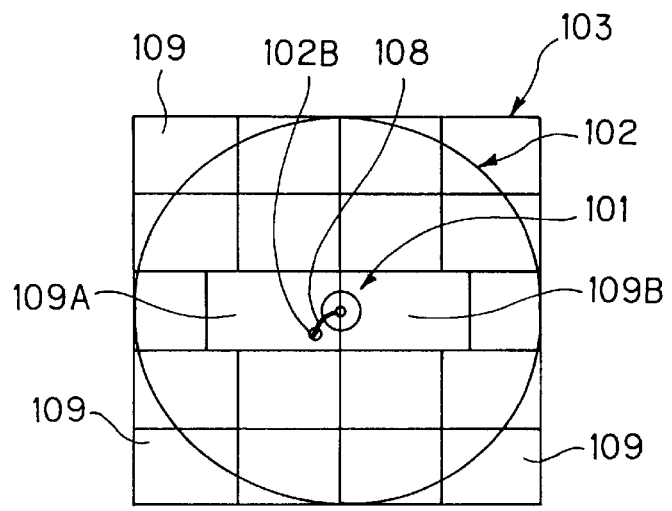
FIG. 4 is a plan view for showing the light source, a reflector and a first integrator lens unit respectively included in the lighting optical system of the first embodiment in a condition of seeing the light source and the reflector through the first integrator lens unit from the side where a display panel is disposed to the side where the light source is disposed.
Figure 5:
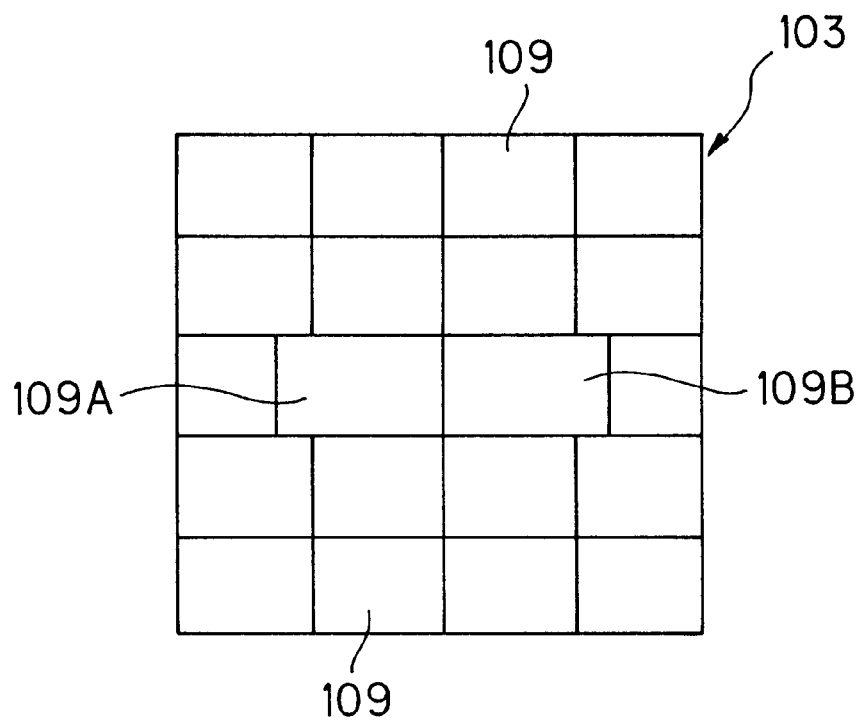
FIG. 5 is a plan view for showing micro lenses disposed in the first integrator lens unit included in the lighting optical system of the first embodiment.

As shown in FIG. 3, the reflector 102 is shaped like a cup and the inner concave surface surrounds the light source 101 from back side thereof. Further, the mounting hole 102A is formed in the bottom portion of the reflector 102, and the light source 101 is mounted on the reflector 102 through the mounting hole 102A. Furthermore, as shown in FIG. 4, the wiring hole 102B is formed in the side portion near the bottom portion of the reflector 102, and a lead wire 108 is wired through the wiring hole 102B. The lead wire 108 connects the light source 101 disposed in the reflector 102 and a power supply (not shown in figures) disposed at the out of the reflector 102 with each other.

The first integrator lens unit 103 is disposed in front of the light source 101 and the reflector 102 at a distance. More specifically, the first integrator lens unit 103 is disposed in such a position that the surface thereof perpendicularly crosses the course (optical axis) of the light reflected in the reflector 102.

Further, the first integrator lens unit 103 has a plurality of micro lenses 109, and these micro lenses 109 are disposed in a matrix, for example a 4×5 matrix. More specifically, the lengths of the lateral sides and the lengths of the longitudinal sides of the micro lenses 109 are the same except for two micro lenses 109A and 109B disposed at the center portion of the first integrator lens unit 103. Namely, the length of the lateral side of each of the micro lenses 109A and 109B is longer than that of any other micro lenses 109.

The second integrator lens unit 104 is disposed in front of the first integrator lens unit 103 at a distance. More specifically, the second integrator lens unit 103 is disposed in such a position that the surface thereof perpendicularly crosses the course (optical axis) of the light passing through the first integrator lens unit 103, and the first integrator lens unit 103 and the second integrator lens unit 104 are positioned in parallel to each other.

Further, the second integrator lens unit 105 has a plurality of micro lenses 110, which are disposed in the matrix in correspondence with the micro lenses 109 disposed in the first integrator lens unit 103.

The condenser lens 105 is disposed in front of the second integrator lens unit 104 at a distance, and the display panel 106 is disposed in front of the condenser lens 105 at a distance.

In operation, as shown in FIG. 2, the light emitted from the light source 101 is reflected by the inner concave surface of the reflector 102, and the reflected light is irradiated into the micro lenses 109 of the first integrator lens unit 103. At this time, this light is divided into a plurality of the lights respectively corresponding to the micro lenses 109 of the first integrator lens unit 103. Namely, the light irradiated into the first integrator lens unit 103 is divided into a plurality of lights disposed in a matrix-like manner by the micro lenses 109. Thereafter, the light passing through each of the micro lenses 109 is irradiated into the micro lenses 110 of the second integrator lens unit 104. At this time, the divided lights are condensed and superposed in one area by the micro lenses 110 of the second integrator lens unit 104. Further, the superposed lights are condensed by the condenser lens 105, and the condensed lights are irradiated into the display panel 106. In this manner, the uniform light can be irradiated into the display panel.

Figure 6:
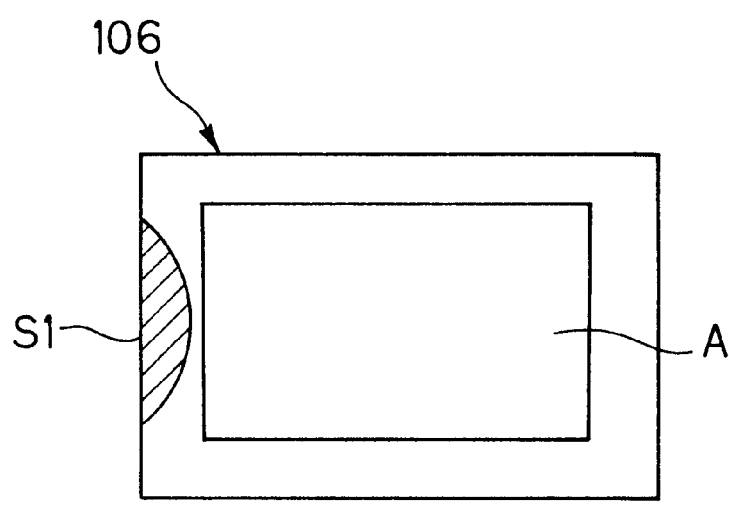
FIG. 6 is a plan view for showing the display panel included in the lighting optical system of the first embodiment and an area of the light irradiated into the display panel.

Here, as mentioned above, in the first integrator unit 103, the length of the lateral side of each of the micro lenses 109A and 109B is longer than that of any other micro lenses 109. Therefore, each of the lights divided by the micro lenses 109A and 109B is respectively extended in the lateral direction, so that an area of light projected in the display panel 106 through each of the micro lenses 109A and 109B is extended in the lateral direction as shown in FIG. 6.

More specifically, as shown in FIG. 4, the light source 101 is positioned at the center portion of the first integrator lens unit 103, and the part of the light source 101 is positioned at the portion opposite to each of the micro lenses 109A and 109B. Therefore, it may be guessed that a shadow S1 of the light source 101 would appear at the right side or the left side in the display panel 106 as shown in FIG. 6.

However, according to the first embodiment, since the length of the lateral side of each of the micro lenses 109A and 109B respectively disposed at the center portion of the first integrator lens unit 103 is longer than that of any other micro lenses 109, and an area of the light projected in the display panel 106 through each of the micro lenses 109A and 109B is extended in the lateral direction. Therefore, even if the shadow S1 of the light source 101 is formed in the display panel 106, the shadow S1 can be moved to the right side or the left side of the display panel 106, and can be moved out from the effective projection area A, where an image is actually projected, of display panel 106, as shown in FIG. 6. As a result, the shadow S1 is substantially removed from the display panel 106. Here, the effective projection area A is defined as an area where light and images actually appear in the display panel, i.e. a so-called visible region.

Thus, according to the lighting optical system 100 of the first embodiment, it is possible to prevent the non-uniformity of luminous intensity and the non-uniformity of color from appearing in the display panel 106, so that the quality of display can be improved.

Figure 7:
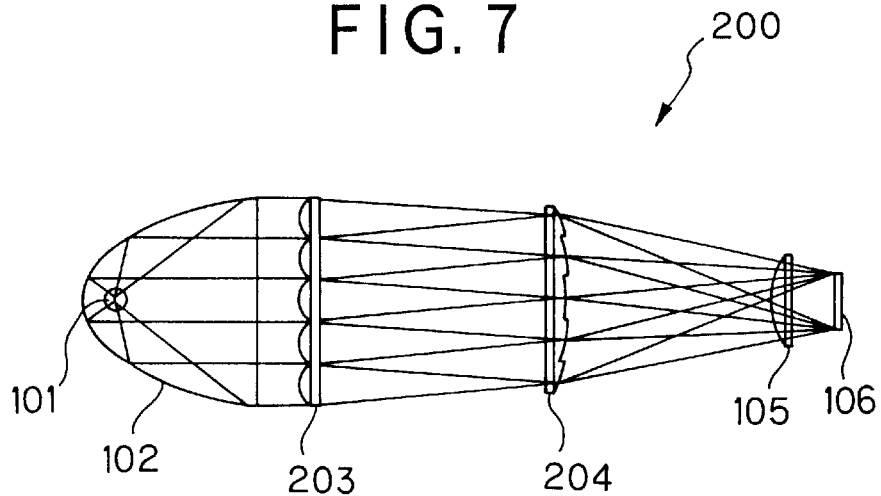
FIG. 7 is a sectional view for showing a lighting optical system of a second embodiment.
Figure 8:
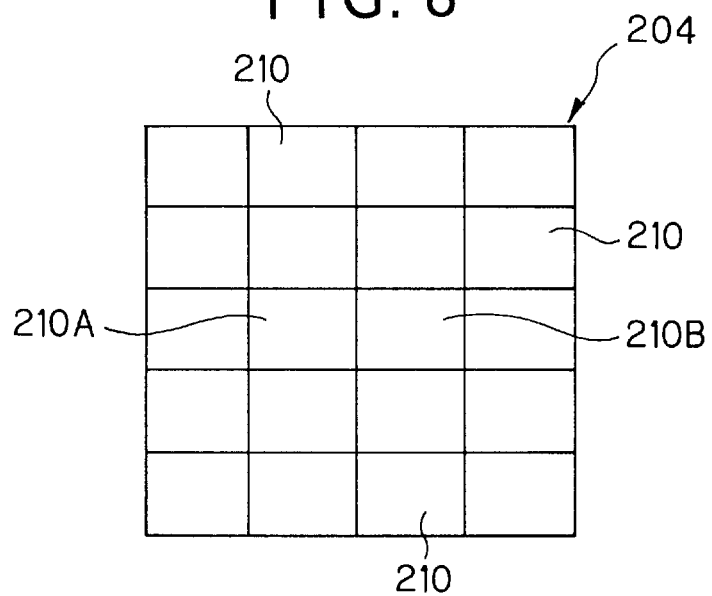
FIG. 8 is a plan view for showing micro lenses disposed in a second integrator lens unit of the second embodiment.
Figure 9:
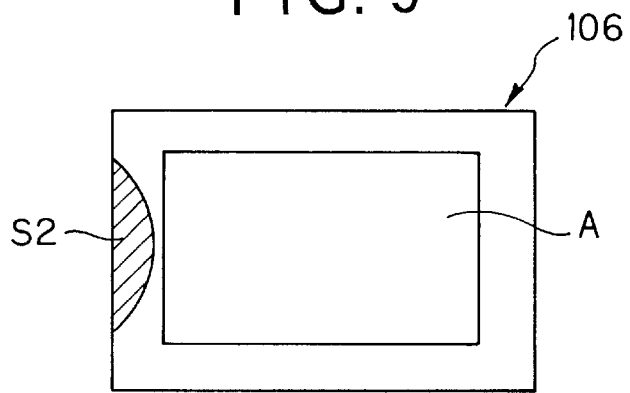
FIG. 9 is a plan view for showing the display panel included in the lighting optical system of the second embodiment and an area of the light irradiated into the display panel.

Next, the second embodiment of the present invention will be explained with reference to FIGS. 7 to 9. In FIGS. 7 and 9, same constructional elements as those in FIGS. 2 and 6 carry the same reference numbers and the explanations thereof are omitted.

In FIG. 7, a lighting optical system 200 of the second embodiment of the present invention is shown.

A first integrator lens unit 203 is disposed in front of the light source 101 and the reflector 102 in such a position that the surface of the first integrator lens unit 203 perpendicularly crosses the course of the light reflected in the reflector 102.

Further, the first integrator lens unit 203 has a plurality of micro lenses 209, and these micro lenses 209 are arrayed in the matrix, for example the 4×5 matrix. All of the micro lenses 209 have the same length of the lateral side and the same length of the longitudinal side.

The second integrator lens unit 104 is disposed in front of the first integrator lens unit 103 at a distance. More specifically, the second integrator lens unit 103 is disposed in such a position that the surface thereof perpendicularly crosses the course of the light passing through the first integrator lens unit 103, and the first integrator lens unit 103 and the second unit integrator lens unit 104 are disposed in parallel to each other.

Further, the second integrator lens unit 104 is constructed of a plurality of micro lenses 210, which are arrayed in the matrix in correspondence with the micro lenses 209 of the first integrator lens unit 203. Furthermore, the focus distance of each of two micro lenses 210A and 210B disposed at the center portion of the second integrator lens unit 204 is longer than that of any other micro lenses 210. Therefore, an area of the light projected in the display panel 106 is extended in the lateral direction and the longitudinal direction. As a result, the area of the light projected in the display panel 106 through each of the micro lenses 210A and 210B is wider than that through any other micro lenses 210.

Therefore, as shown in FIG. 9, the shadow S2 of the light source 101 is formed in the display panel 106 such that the shadow S2 can be moved to the right side or the left side of the display panel 106. Namely, the shadow S2 can be moved out from the effective projection area A of display panel 106.

As a result, the shadow S2 is substantially removed from the display panel 106.

Thus, according to the lighting optical system 200 of the second embodiment, it is possible to prevent the non-uniformity of luminous intensity and the non-uniformity of color from appearing in the display panel 106, and the quality of display can be also improved.

In addition, each of the two micro lenses 210A and 210B disposed at the center portion of the second integrator lens unit 204 may have the lens whose focus distance changes by the direction of the light passing through, such as a toric lens. In this construction, the shadow of the light source 101 can be moved out from the projection area A of display panel 106. Thus, it is possible to prevent the non-uniformity of luminous intensity and the non-uniformity of color from appearing in the display panel 106, and the quality of display can be also improved.

Figure 11:
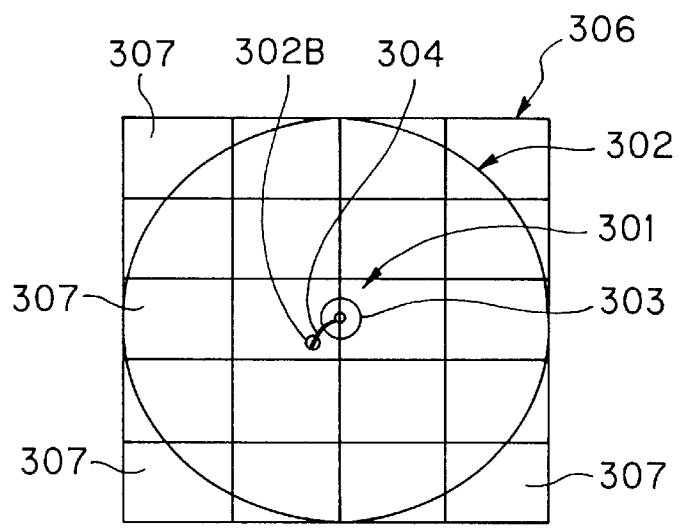
FIG. 11 is a plan view for showing the light source, a reflector and a first integrator lens unit respectively included in the lighting optical system of the third embodiment in a condition of seeing the light source and the reflector through the first integrator lens unit from the side where a display panel is disposed to the side where the light source is disposed.
Figure 12:
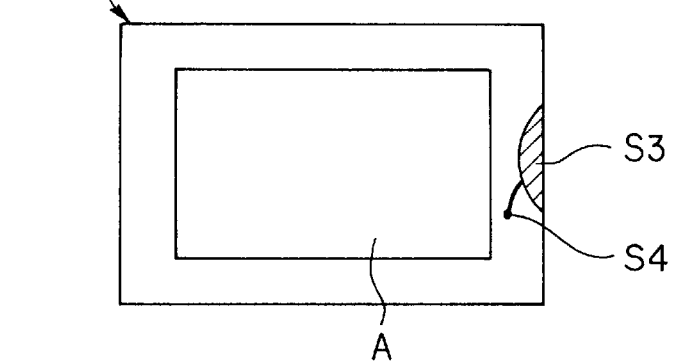
FIG. 12 is a plan view for showing the display panel included in the lighting optical system of the third embodiment and an area of the light irradiated into the display panel.

Next, the third embodiment of the present invention will be explained with reference to FIGS. 10 to 12. In FIGS. 11 and 12, same constructional elements as those in FIGS. 4 and 6 carry the same reference numbers and the explanations thereof are omitted.

Figure 10:
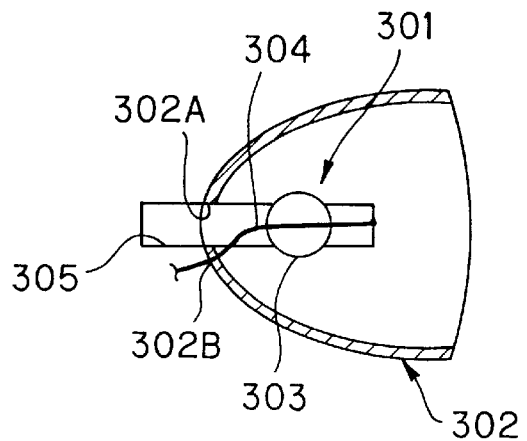
FIG. 10 is a sectional view for showing a light source included in a lighting optical system of a third embodiment.

In FIG. 10, a light source 301 and a reflector 302 respectively included in a lighting optical system of the third embodiment of the present invention are shown.

The light source 301 has a lamp 303 for emitting the light and a lead wire 304 for connecting the lamp 303 and a power supply disposed at the external to each other. Further, the lamp 303 is mounted at the bottom portion of the reflector 302 by a mounting member 305.

The reflector 302 is shaped like a cup and the inner concave surface surrounds the light source 301 from the back side thereof. Further, the mounting hole 302A is formed in the bottom portion of the reflector 302, and an end portion of the mounting member 305 is inserted and fixed in the mounting hole 302A, and thus, the lamp 303 is installed to the bottom side of the reflector 302.

Furthermore, the wiring hole 302B in order to wire the line wire 304 is formed in the reflector 302. More specifically, as shown in FIG. 11, seeing through the first integrator lens unit 103 from the side where the display panel 106 is disposed to the side where the light source 301 is disposed, the wiring hole 302B is positioned in an area of one micro lens 109 disposed at the center portion of the first integrator lens unit 103 and is positioned near the edge of the first integrator lens unit 103.

Further, the line wire 304 is extended from the top portion to the end portion of the mounting member 305 along the circumferential surface of the mounting member 305, and the line wire 304 passes through the wiring hole 302B and is extended to the external.

The first integrator lens unit 306 is the same construction as the first integrator lens unit 203 described in the second embodiment, and the first integrator lens unit 306 has a plurality of micro lenses 307 in the same manner as the first integrator lens unit 203 described in the second embodiment. The second integrator lens unit is the same construction as the second integrator lens unit 104 described in the first embodiment.

As mentioned above, since the distance between the wiring hole 302B and the light source 301 is very short, and the lead wire 304 is disposed along the circumferential surface of the mounting member 305, the line wire 304 of the light source 301 does not obstruct the progression of the light, which is emitted from the light source 301 and reaches the first integrator lens unit 103.

Namely, the light reflected from the reflector 302 goes straight toward the first integrator lens unit 103, and the beams of light are disposed in parallel to each other. Therefore, the influence by the lead wire 304 of the light source 301 can be restricted to a narrow area near the edge of one micro lens 109 disposed at the center portion of the first integrator lens unit 103. Thus, as shown in FIG. 12, when an image is projected in the display panel 106, each of a shadow S3 of the line wire 304 and a shadow S4 of the wiring hole 302B is positioned outside of the effective projection area A of the display panel 106, so that the shadows S3 and S4 are substantially removed from the display panel 106.

Thus, according to the lighting optical system of the third embodiment, it is possible to prevent the non-uniformity of luminous intensity and the non-uniformity of color from appearing in the display panel 106, and the quality of display can be improved.

Figure 13:
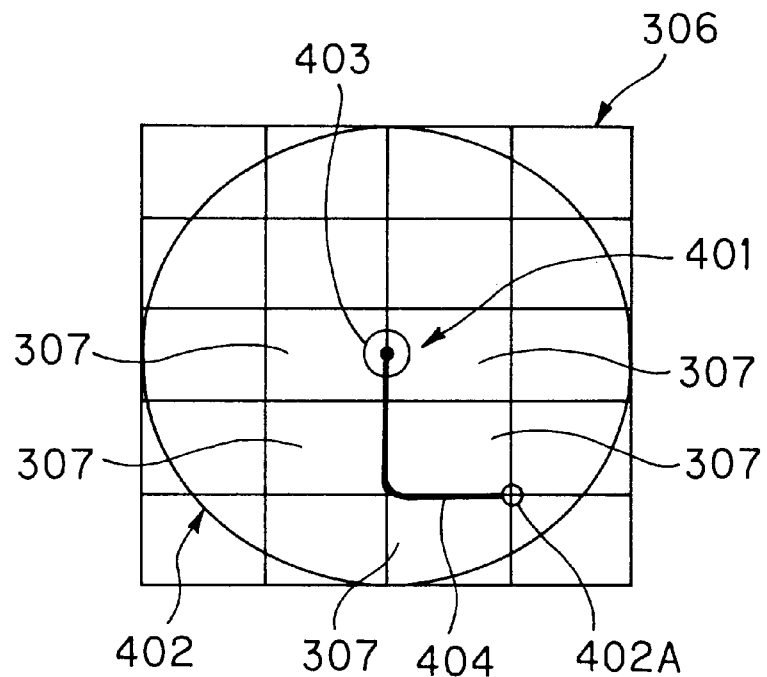
FIG. 13 is a plan view for showing a light source, a reflector and a first integrator lens unit respectively included in a lighting optical system of a fourth embodiment in a condition of seeing the light source and the reflector through the first integrator lens unit from the side where a display panel is disposed to the side where the light source is disposed.
Figure 14:
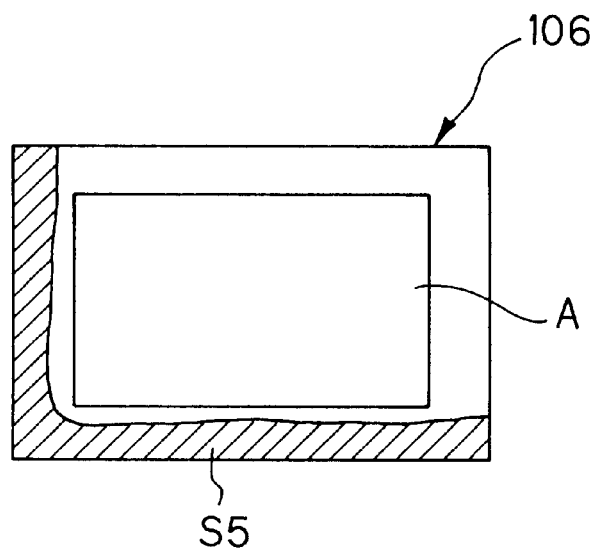
FIG. 14 is a plan view for showing the display panel included in the lighting optical system of the fourth embodiment and an area of the light irradiated into the display panel.

Next, the fourth embodiment of the present invention will be explained with reference to FIGS. 13 and 14. In FIGS. 13 and 14, same constructional elements as those in FIGS. 11 and 12 carry the same reference numbers and the explanations thereof are omitted.

FIG. 13 is a diagram to show the light source 401, the reflector 402 and the first integrator lens unit 306 respectively included in a lighting optical system of the fourth embodiment of the present invention in a condition of seeing the light source 401 and the reflector 402 through the first integrator lens unit 306 from the side where the display panel 106 is disposed to the side where the light source 401 is disposed.

The light source 401 has a lamp 403 and a lead wire 404 for connecting between the lamp 403 and a power supply disposed at the external. The light source 401 has the same construction as the light source 301 described in the third embodiment except for the disposition of the lead wire 404. Further, the reflector 402 also has the same construction as the reflector 302 described in the third embodiment except for the position of a wiring hole 402A.

Namely, as shown in FIG. 13, seeing through the first integrator lens unit 306 from the side where the display panel 106 is disposed to the side where the light source 401 is disposed, the lead wire 404 of the light source 401 is extended from the lamp 403 to the wiring hole 402A formed in the reflector 402 such that a course of the wired lead wire 404 is the same as a boundary between the micro lenses 307 of the first integrator lens unit 306 adjacent to each other. Further, seeing through the first integrator lens unit 307 from the side where the display panel 306 disposed to the side where the light source 401 is disposed, the wiring hole 402A is formed in the reflector 402 at the position opposite to a boundary between the micro lenses 307 adjacent to each other.

Therefore, when the light is emitted from the light source 401, is reflected in the reflector 402, and is irradiated to the first integrator lens unit 306, the shadow of the lead wire 404 is projected along the boundary between the micro lenses 307 of the first integrator lens unit 306 adjacent to each other. Thus, as shown in FIG. 14, the shadow S5 of the lead wire 404 is positioned outside of the effective projection area A of the display panel 106, so that the shadow S5 of the lead wire 404 is substantially removed from the display panel 106.

Thus, according to the lighting optical system of the fourth embodiment, it is possible to prevent the non-uniformity of luminous intensity and the non-uniformity of color from appearing in the display panel 106, and the quality of display can be improved.

Figure 15:
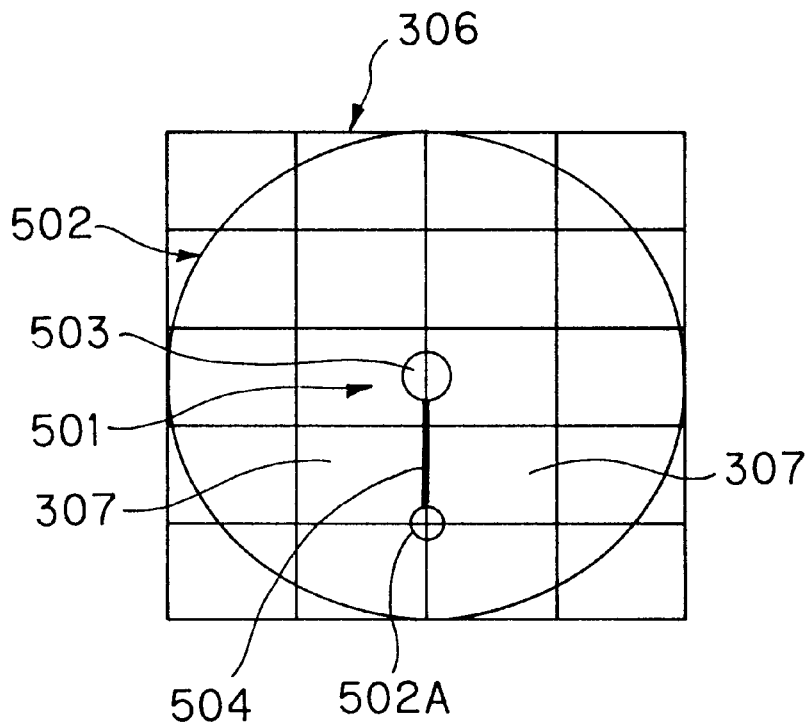
FIG. 15 is a plan view for showing a light source, a reflector and a first integrator lens unit respectively included in a lighting optical system of a fifth embodiment in a condition of seeing the light source and the reflector through the first integrator lens unit from the side where a display panel is disposed to the side where the light source is disposed.
Figure 16:
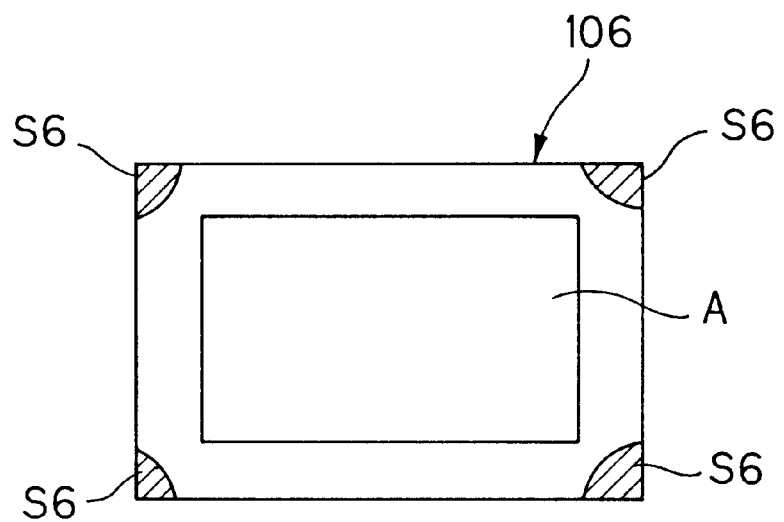
FIG. 16 is a plan view for showing the display panel included in the lighting optical system of the fifth embodiment and an area of the light irradiated into the display panel.

Next, the fifth embodiment of the present invention will be explained with reference to FIGS. 15 and 16. In FIGS. 15 and 16, same constructional elements as those in FIGS. 11 and 12 carry the same reference numbers and the explanations thereof are omitted.

FIG. 15 is a diagram to show the light source 501, the reflector 502 and the first integrator lens unit 306 respectively included in a lighting optical system of the fifth embodiment of the present invention in a condition of seeing the light source 501 and the reflector 502 through the first integrator lens unit 306 from the side where the display panel 106 is disposed to the side where the light source 501 is disposed.

The light source 501 has a lamp 503 and a lead wire 504 for connecting the lamp 503 and a power supply disposed at the external to each other. The light source 501 has the same construction as the light source 301 described in the third embodiment except for the disposition of the lead wire 504. Further, the reflector 502 also has the same construction as the reflector 302 described in the third embodiment except for the position of a wiring hole 502A.

Namely, as shown in FIG. 15, seeing through the first integrator lens unit 306 from the side where the display panel 106 is disposed to the side where the light source 501 is disposed, the lead wire 504 of the light source 501 is extended from the lamp 503 to the wiring hole 502A formed in the reflector 502 such that a course of the wired lead wire 504 is the same as a boundary between the micro lenses 307 of the first integrator lens unit 306 adjacent to each other. Further, seeing through the first integrator lens unit 103 from the side where the display panel 106 disposed to the side where the light source 501 is disposed, the wiring hole 502A is formed in the reflector 502 at the position opposite to one corner of the micro lens 307 of the first integrator lens unit 306.

Therefore, as shown in FIG. 16, when the light is emitted from the light source 501 and an image is projected into the display panel 106, shadows S6 of the wiring hole 502A formed in the reflector 502 are positioned outside of the effective projection area A of the display panel 106, so that the shadows S6 of the lead wire are substantially removed from the display panel 106. Thus, the same effect as the aforementioned third embodiment can be obtained.

Figure 17:
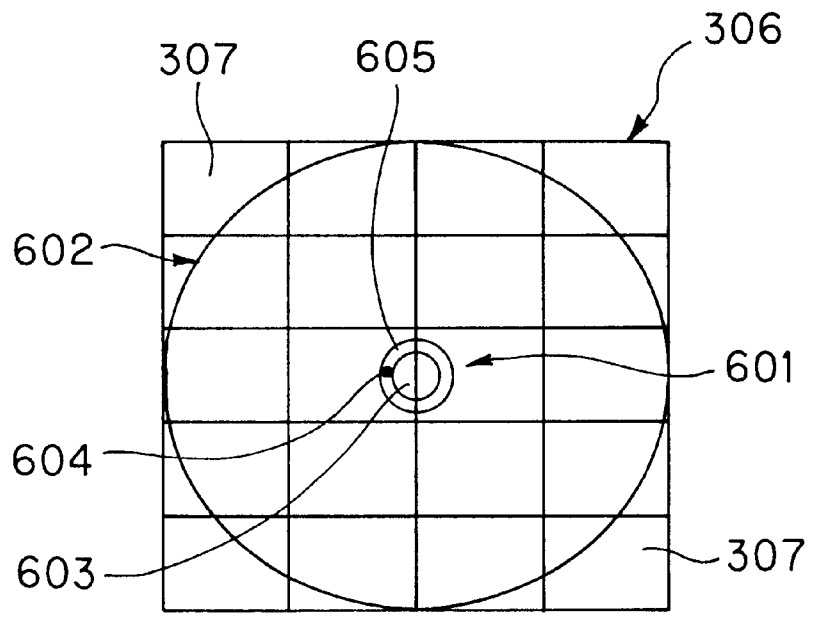
FIG. 17 is a plan view for showing a light source, a reflector and a first integrator lens unit respectively included in a lighting optical system of a sixth embodiment in a condition of seeing the light source and the reflector through the first integrator lens unit from the side where a display panel is disposed to the side where the light source is disposed.
Figure 18:
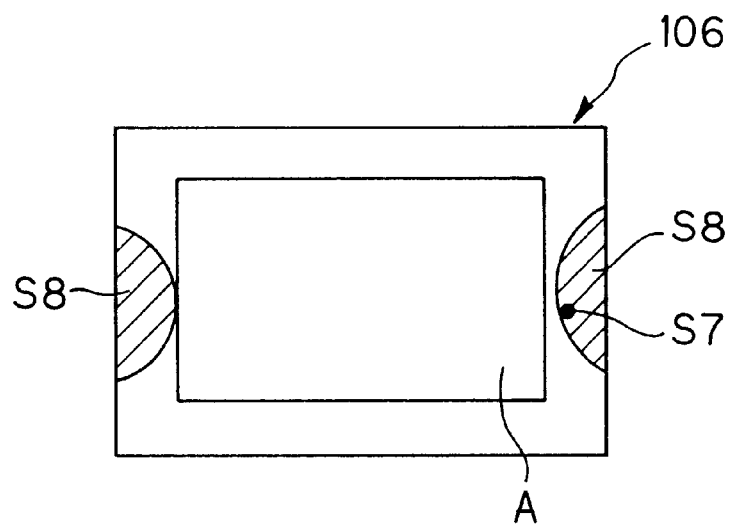
FIG. 18 is a plan view for showing the display panel included in the lighting optical system of the sixth embodiment and an area of the light irradiated into the display panel.

Next, the sixth embodiment of the present invention will be explained with reference to FIGS. 17 and 18. In FIGS. 17 and 18, same constructional elements as those in FIGS. 11 and 12 carry the same reference numbers and the explanations thereof are omitted.

FIG. 17 is a diagram to show the light source 601, the reflector 602 and the first integrator lens unit 306 respectively included in a lighting optical system of the sixth embodiment of the present invention in a condition of seeing the light source 601 and the reflector 602 through the first integrator lens unit 306 from the side where the display panel 106 is disposed to the side where the light source 601 is disposed.

The light source 601 has a lamp 603 and a lead wire 604 for connecting the lamp 603 and a power supply disposed at the external to each other, and the light source 601 is mounted on the bottom portion of the reflector 602 by a mounting member 605 shaped like a tube. The light source 601 has the same construction as the light source 301 described in the third embodiment except for the disposition of the lead wire 604. Further, the reflector 602 also has the same construction as the reflector 302 described in the third embodiment except that a wiring hole to lead out the lead wire 604 to the external power supply is removed.

Namely, as shown in FIG. 17, seeing through the first integrator lens unit 103 from the side where the display panel 106 is disposed to the side where the light source 601 is disposed, the lead wire 604 of the light source 601 is extended from the lamp 603 to the external power supply through the inside of the mounting member 605 shaped like a tube.

Therefore, as shown in FIG. 18, when the light is emitted from the light source 601 and an image is projected into the display panel 106, a shadow S7 of the lead wire 604 is positioned outside of the effective projection area A of the display panel 106 together with a shadows S8 of the light source 601, so that each of the shadow S7 of the lead wire 604 and the shadows S8 of the light source 601 are substantially removed from the display panel 106. Thus, the same effect as the aforementioned third embodiment can be obtained.

In addition, in each of the aforementioned embodiments, each of the first integrator lens unit 103 (203, 306) and the second integrator lens unit 104 (204) is separately disposed. However, a lens unit in which the first integrator lens unit and the second integrator are combined may be used in the lighting optical system of the present invention. Further, in each of the aforementioned embodiments, the condenser lens 105 is disposed and the light passing through the second integrator lens unit 104 (204) is condensed by the condense lens 105. However, even if the condense lens 105 would be removed in the lighting optical system of the present invention, the approximately the same effects as each of the aforementioned embodiments can be obtained.

Further, in each of the fourth to sixth embodiments, the first integrator lens unit 306 is the same construction as the first integrator lens unit 203 described in the second embodiment. However, the first integrator lens unit 306 may be the same construction as the first integrator lens unit 103, in which the area of each of two micro lenses disposed at the center of the first integrator lens unit 103 is larger than that of any other micro lenses disposed in the first integrator lens unit 103, described in the first embodiment.

Furthermore, in each of the fourth to sixth embodiments, the second integrator lens unit is the same construction as the second integrator lens unit 104 described in the first embodiment. However, the second integrator lens unit may be the same construction as the second integrator lens unit 204, in which the focus distance of each of two micro lenses disposed at the center of the second integrator lens unit 204 is longer than that of any other micro lenses disposed in the second integrator lens unit 204, described in the second embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A lighting optical system for irradiating a light into a display panel, comprising:
   a light source for emitting a light;
   a reflector for reflecting the emitted light;
   a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively, an area of at least one of the micro lenses disposed at a center portion of the first integrator lens unit being larger than an area of any one of the micro lenses disposed in the first integrator lens unit other than said at least one; and
   a second integrator lens unit disposed at a place where a surface thereof crosses an optical axis of each of the divided light beams, the second integrator lens unit having a plurality of micro lenses arranged in a matrix, the second integrator lens unit for condensing the divided light beams so that the condensed light beams are irradiated into the display panel.

2. A lighting optical system for irradiating a light into a display panel, comprising:
   a light source for emitting a light;
   a reflector for reflecting the emitted light;
   a first integrator lens unit disposed at the place that a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and
   a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, a focus distance of at least one of the micro lenses disposed at a center portion of the second integrator lens unit being longer than a focus distance of any one of the micro lenses disposed in the second integrator lens unit other than said at least one.

3. A lighting optical system for irradiating a light into a display panel, comprising:
   a light source for emitting a light;
   a reflector for reflecting the emitted light;
   a first integrator lens unit disposed at the place that a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and
   a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, at least one of the micro lenses disposed at a center portion of the second integrator lens unit comprising a toric lens.

4. A lighting optical system for irradiating a light into a display panel, comprising:
   a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the lead wire of the light source being wired along an outside face of the mounting member, and wherein an area of at least one of the micro lenses disposed at the center portion of the first integrator lens unit is larger than an area of any one of the micro lenses disposed in the first integrator lens unit other than said at least one.

5. A lighting optical system for irradiating a light into a display panel, comprising:

a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the lead wire of the light source being disposed at a position opposite to a boundary between the micro lenses disposed in the first integrator lens unit in a condition of seeing the lead wire through the first integrator lens unit from the side where the display panel is disposed.

6. A lighting optical system for irradiating a light into a display panel, comprising:

a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the wiring hole of the reflector being disposed at the position opposite to a boundary between the micro lenses disposed in the first integrator lens unit in a condition of seeing the lead wire through the first integrator lens unit from the side where the display panel is disposed.

7. A lighting optical system according to claims 5 or 6, wherein an area of at least one of the micro lenses disposed at the center portion of the first integrator lens unit is larger than an area of any one of the micro lenses disposed in the first integrator lens unit other than said at least one.

8. A lighting optical system according to claims 5 or 6, wherein a focus distance of at least one of the micro lenses disposed at the center portion of the second integrator lens unit is longer than a focus distance of any one of the micro lenses disposed in the second integrator lens unit other than said at least one.

9. A lighting optical system for irradiating a light into a display panel, comprising:

a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the lead wire of the light source being wired from the lamp of the light source of the power supply disposed at the external through the mounting hole, and wherein an area of at least one of the micro lenses disposed at the center portion of the first integrator lens unit is larger than an area of any one of the micro lenses disposed in the first integrator lens unit other than said at least one.

10. A lighting optical system for irradiating a light into a display panel, comprising:

a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the lead wire of the light source being wired along an outside face of the mounting member, and wherein a focus distance of at least one of the micro lenses disposed at the center portion of the second integrator lens unit is longer than a focus distance of any one of the micro lenses disposed in the second integrator lens unit other than said at least one.

11. A lighting optical system for irradiating a light into a display panel, comprising:

a light source having a lamp for emitting a light and a lead wire for connecting the lamp to a power supply disposed at the external;

a reflector having a concave portion for reflecting the emitted light by an inner surface thereof, a mounting hole for mounting the lamp of the light source and a wiring hole for wiring the lead wire from the lamp to the power supply;

a mounting member disposed in the mounting hole for mounting the lamp of the light source;

a first integrator lens unit disposed at a place where a surface thereof crosses an optical axis of the reflected light, the first integrator lens unit having a plurality of micro lenses arranged in a matrix, the first integrator lens unit dividing at least the reflected light into a plurality of light beams corresponding to the micro lenses respectively; and a second integrator lens unit disposed at a place where a surface thereof crosses an optical axis of each of the divided light beams, the second integrator lens unit having a plurality of micro lenses arranged in a matrix, the second integrator lens unit condensing the divided light beams so that the condensed light beams are irradiated into the display panel, the lead wire of the light source being wired from the lamp of the light source of the power supply disposed at the external through the mounting hole, and wherein a focus distance of at least one of the micro lenses disposed at the center portion of the second integrator lens unit is longer than a focus distance of any one of the micro lenses disposed in the second integrator lens unit other than said at least one.

* * * * *